United States Patent [19]

Monigold et al.

[11] 4,371,181

[45] Feb. 1, 1983

[54] COLLISION RESISTANT AUXILIARY FUEL SYSTEM

[76] Inventors: Ray A. Monigold, 3226 193rd Pl. SE., Bothell, Wash. 98011; William F. Russell, 9415 SE. 52nd St., Mercer Island, Wash. 98040

[21] Appl. No.: 144,886

[22] Filed: Apr. 29, 1980

[51] Int. Cl.³ .............................................. B60K 15/02
[52] U.S. Cl. ................................. 280/5 A; 137/68 R; 137/572; 137/590
[58] Field of Search .............. 280/5 A, 5 R, 783, 784; 296/188, 189; 137/571, 572, 574, 590, 68 R, 67; 180/284, 282

[56] References Cited

U.S. PATENT DOCUMENTS

| | | | |
|---|---|---|---|
| 1,485,975 | 3/1924 | Geiglein | 224/42.14 |
| 2,631,886 | 3/1953 | Keller | 296/37.2 |
| 2,654,553 | 10/1953 | Noon et al. | 244/135 R |
| 2,808,892 | 10/1957 | Walker | 280/5 A |
| 3,020,950 | 2/1962 | Schraivogel | 137/574 |
| 3,035,797 | 5/1962 | Neushotz | 137/574 |
| 3,049,171 | 8/1962 | Neuerburg et al. | 137/574 |
| 3,173,469 | 3/1965 | Shockey | 137/574 X |
| 3,511,515 | 5/1970 | Cline et al. | 280/5 R |
| 3,697,093 | 10/1972 | Cadiou | 280/5 A |
| 3,893,678 | 7/1975 | Engdahl | 280/5 A |
| 3,964,755 | 6/1976 | Riddy | 280/5 A |
| 4,064,889 | 12/1977 | Gayle et al. | 137/68 R |
| 4,090,721 | 5/1978 | Wedin et al. | 280/5 A |

FOREIGN PATENT DOCUMENTS

| | | | |
|---|---|---|---|
| 2006929 | 9/1971 | Fed. Rep. of Germany | 280/5 A |
| 2024664 | 12/1971 | Fed. Rep. of Germany | 280/5 A |
| 2401728 | 7/1975 | Fed. Rep. of Germany | 280/5 A |
| 2828715 | 9/1979 | Fed. Rep. of Germany | 280/5 A |

OTHER PUBLICATIONS

Tire Tank, Advertisment from Combustion Research & Technology, Inc., Seattle, Wash., 1979.

*Primary Examiner*—John A. Pekar
*Attorney, Agent, or Firm*—Gregory W. Moravan; David M. Deits; Donald R. Mollick

[57] ABSTRACT

An auxiliary fuel system for installation beneath the rear portion of the floor pan of a passenger car. The auxiliary fuel tank in the system is resistant to leakage even when the car in which it is installed is subjected to a rear end collision. The system increases the survivability of the auxiliary fuel tank by the use of transversely extending support straps which permit the longitudinal forward and downward movement of the auxiliary tank during said collision, to thereby help prevent its being crushed. The tank's ability to move downwardly as it moves forwardly during said collision is enhanced by the tank being provided with a sloping front wall which deflects the front of the tank downwardly as it encounters a transverse member in the car, and by the tank also being provided with a large, relatively shallow fuel storage area designed to bulge during said collision, thereby also tending to force the tank downwardly away from the car. The leakage resistance of the tank may be enhanced by providing a check valve in its fuel filler pipe and by providing precrimped break and seal fittings which seal both the tank and its associated fuel lines during the forward and downward movement of the tank.

12 Claims, 15 Drawing Figures

COLLISION RESISTANT AUXILIARY FUEL SYSTEM

SUMMARY OF THE INVENTION

If past experience is any teacher, for the forseeable future it seems likely that there will be repeated restrictions on the availability of liquid fuels for passenger cars, such as gasoline, diesel fuel and alcohol. These restrictions on availability can be caused by any of a variety of factors, such as by foreign oil producers refusing to export oil to the United States, by the intentional withholding of fuels from the marketplace by fuel companies in order to raise profits, by the mismanagement of fuel resources and allocations by the many layers of governmental and private controlling bodies involved in the production and distribution of fuels, by the panic buying of fuels by an alarmed public in times of perceived shortage, or by the fundamental reason that with an ever expanding world population consuming non-renewable or limited resources, there are some who will not be able to purchase all the fuel they need, when they need it.

Whatever the cause of the restrictions on the availability of fuel, one basic method of overcoming them is to provide cars with an increased fuel capacity, which will, in turn, increase their range and endurance. This is important since as a car's fuel capacity is increased, its ability to make longer round trips without needing to refuel during the trip is also increased. Thus, the driver with a larger fuel supply can take a longer round trip and still be assured he will make it home and not be stranded on the road by a lack of fuel availability. Or, if going on an extended trip, the driver may be able to drive past areas in which fuel is locally unavailable, to areas with a better supply where he may refuel.

In addition, as more and more service stations close or shorten their hours due to shortages in fuel supplies, having a car with a larger fuel supply means the driver will have to refuel less frequently, thereby reducing the number of times he has to wait in a fuel line at a service station. Naturally, if everyone had a car with a large fuel capacity, fuel lines might well be significantly reduced since each person would need to refuel less frequently.

However, because of the ample fuel availability in the past, there are presently millions of cars on the road today with a relatively limited range and endurance because they have relatively small fuel capacities and poor gas mileage ratings. However, if the driver attempts to increase his car's range and endurance by carrying fuel cans within his car, he not only reduces the car's useable trunk or passenger space, but he also subjects himself and his passengers to great danger from fire should his car be involved in a collision.

Accordingly, some of the objects of the present invention are to provide an auxiliary fuel system which will not occupy otherwise useable space in the car's trunk or passenger compartment, and which will be much less likely to leak or release fuel into the interior of the car before or during a collision. This object is at least partially achieved by mounting the present invention's auxiliary fuel system to the outside of the bottom of the car, and preferably to the exterior of the car's floor pan. By so locating the auxiliary fuel system, it is clear that none of the car's otherwise useable trunk or passenger space will be taken up, and that normally, it will be impossible for the fuel to leak into the interior of the car. Even if the car is in a collision severe enough to cause the auxiliary fuel system to leak, it is much more likely that the fuel will be spilled outside of the car rather than inside it.

Another object of the present invention is to avoid reducing the car's ground clearance as much as possible, even though the auxiliary fuel system is located beneath the car. This object is at least partially achieved by locating the auxiliary tank rearwardly from the car's rear main transverse member (usually the rear axle/differential assembly in a rear wheel drive car, and the rear main frame member in a front wheel drive car), and is also achieved by shaping the auxiliary fuel tank so as to optimally use the available spaces located rearwardly of said transverse member. Preferably, the bottom of the auxiliary tank will not extend significantly below the plane of the bottom of said transverse member. In those cars having a spare tire wheel well depending from the trunk, the tank is preferably shaped to fill the spaces between the spare tire wheel well and said transverse member, and to occupy the space below the spare tire wheel well and above the plane of the bottom of said transverse member.

However, as is known, locating any gas tank rearwardly of the car's said transverse member gives rise to the danger that during a rear end collision of the car, the tank will be crushed against said transverse member, with the attendant danger of leakage and fire. Accordingly, it is a primary object of the present invention to also provide an auxiliary fuel system in which this danger is significantly reduced by enabling the auxiliary tank to move forwardly and downwardly during a rear end collision, and thus avoid being crushed against said transverse member.

This object is at least partially achieved by several factors. The first of these factors is that the supports which fasten the auxiliary tank to the car extend transversely with respect to the car and are located away from the front of the auxiliary tank. Preferably, no full length longitudinal supports are used to mount the auxiliary tank to the car, and all fastening of the supports to the car are at the sides, not at the front of the auxiliary tank. Then, during a rear end collision of the car, the transverse supports will permit the forward and downward longitudinal movement of the auxiliary tank with respect to the car, and help avoid the crushing of the auxiliary tank against said transverse member.

Another factor is that the front portion of the auxiliary tank has an inclined front wall adapted to deflect the auxiliary tank downwardly as it moves forwardly and strikes said transverse member during said rear end collision, thus helping the auxiliary tank to avoid being crushed against said transverse member. Further, the auxiliary tank may include a large portion which is relatively shallow in depth as compared to its area, to enable the middle of said large portion to bulge outwardly against the bottom of the car during said rear end collision, thereby assisting the front of the auxiliary tank to move downwardly as it moves forwardly during said rear end collision.

Of course, it will be appreciated that permitting the forward and downward movement of the auxiliary tank during said rear end collision to avoid its being crushed against said transverse member, may give rise to a problem in that the auxiliary tank's associated fuel filler pipe and fuel lines may separate from the auxiliary tank due to its motion relative to the car. Accordingly, another object of the present invention is to reduce fuel loss from the auxiliary tank despite its attendant movement during said rear end collision.

This object is achieved by providing a check valve of unusual construction in the auxiliary tank's inlet for its fuel filler pipe, which helps to prevent fuel from surging out of the auxiliary tank due to the impact of the collision, and which may also reduce or prevent leakage from the auxiliary tank after the collision. In addition, the auxiliary tank may be provided with pre-crimped break and seal type fittings which are attached to the auxiliary tank and to which the auxiliary tank's associated fuel lines are connected. Then, during the tank's forwardly and downwardly movement during said rear end collision, the fittings break and seal to reduce or prevent leakage from the auxiliary tank or its associated fuel lines. Alternatively, the auxiliary tank may be provided with non-metallic, flexible fuel lines which have enough slack in them to accommodate, without breaking, a reasonable amount of movement of the auxiliary tank during said collision.

Other objects of the present invention are to permit the easy filling and the complete emptying of both the auxiliary tank of the present invention, as well as the car's main tank. Easy filling is accomplished by providing the auxiliary tank with a large fuel filler pipe inlet connected to the main tank's fuel filler pipe. Complete emptying of both tanks is accomplished by providing that the lowest portion of the auxiliary tank is lower than the main tank, so that the main tank will empty by siphon or gravity feed into the auxiliary tank via a fuel transfer line connected therebetween. Naturally, in such a case, the fuel supply to the car's engine is via a fuel delivery line from the auxiliary tank.

A further object of the present invention is to provide for the complete emptying of said auxiliary tank despite its having a substantially flat bottom in order to provide maximum ground clearance. This object is at least partially achieved by providing upstanding sump walls around the fuel transfer inlet and the fuel delivery outlet of the auxiliary tank, and/or by providing that the bottom of the sump is slightly below the bottom of the auxiliary tank. Slots in the sump walls permit the flow of fuel into the sump during normal operation of the car, but permit the fuel to escape only slowly from the sump during the car's acceleration, deceleration or cornering.

Complete emptying of the auxiliary fuel tank can be a problem in those cars, such as diesel cars, which have a fuel return line from the car's engine to the car's main tank. This problem is solved in two ways. The first way is by diverting the fuel return line from the main tank to a fuel return inlet provided in the auxiliary tank which opens into said sump. The second way is that one end of a jet line is connected to said fuel return inlet, while its other end is located opposite the auxiliary tank's fuel delivery outlet. This not only helps to ensure that most, if not all, of the fuel returned to the auxiliary tank will be delivered to said outlet, but also gives rise to an aspirating effect which withdraws additional fuel from the sump as needed.

It is to be understood that the foregoing is but a brief summary, not a detailed catalog, of some of the objects and features of the present invention, and is not to be taken as a limitation on the scope of the present invention. The scope of the present invention is to be construed to include all of the features and benefits inherent in the disclosed invention, whether or not specifically mentioned anywhere herein.

DESCRIPTION OF THE PREFERRED EMBODIMENTS

As will be made clear in the description which follows, the auxiliary fuel system of the present invention comprises a new and ingenious auxiliary fuel tank, unique mounting means for the auxiliary tank which permit the forward and downward movement of the auxiliary tank during a rear end collision of the car on which it is installed, and means for reducing or preventing leakage from the auxiliary tank and its associated fuel filler pipe and fuel lines despite such movement of the auxiliary tank during said rear end collision.

Figure 1:
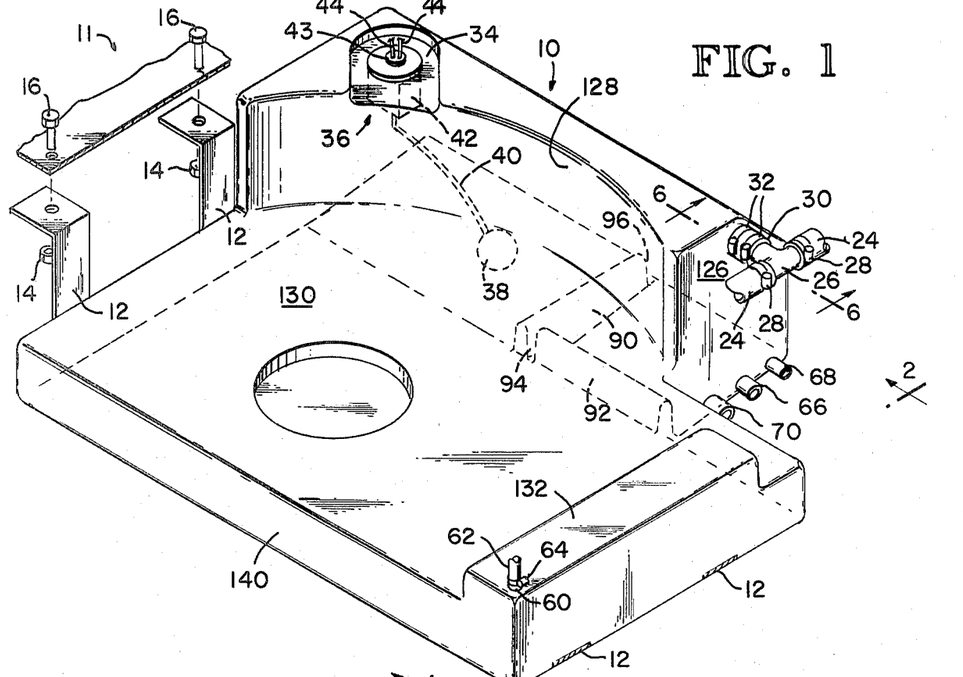
FIG. 1 is a perspective view from an upper rear aspect of the auxiliary fuel system of the present invention.
Figure 4:
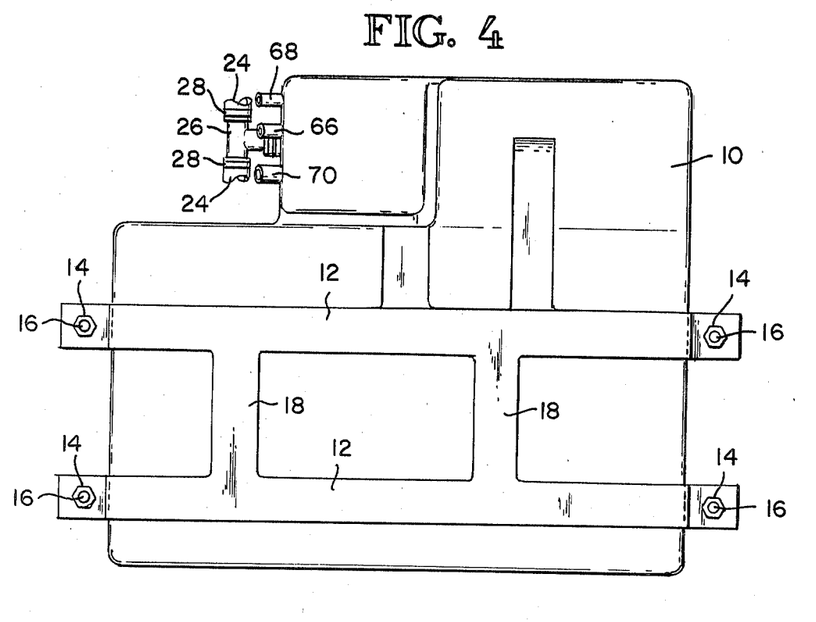
FIG. 4 is an elevational view of the bottom of FIG. 1.
Figure 5:
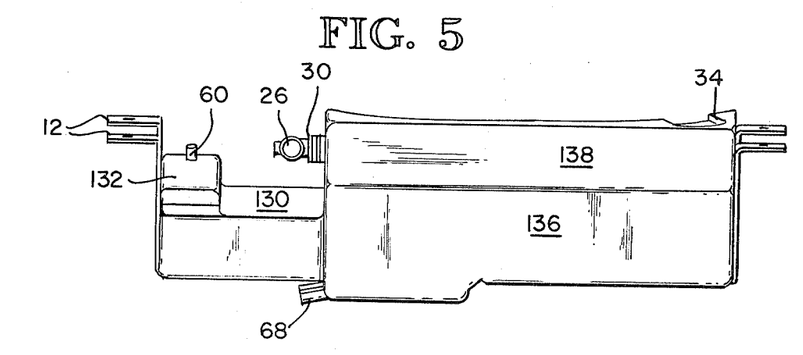
FIG. 5 is an elevational view of the front of FIG. 1.
Figure 8:
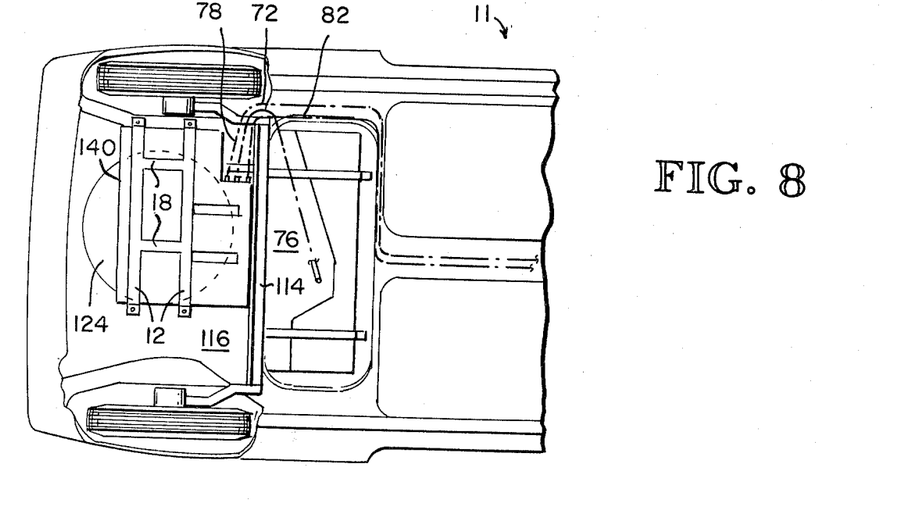
FIG. 8 is an elevational view of the bottom of a car showing the auxiliary fuel system of the present invention installed therein.

Referring now to the figures, and in particular FIGS. 1 4 and 8, it is seen that the auxiliary fuel tank, generally designated at 10, is secured to the outside of the bottom of the car, generally designated at 11, with a pair of transverse mounting straps 12 by means of nuts 14 and bolts 16. As seen in FIGS. 4 and 8, between the transverse mounting straps 12 are secured a pair of short longitudinal reinforcing straps 18 which, together with the transverse straps 12, form a basket like support to securely hold the auxiliary tank 10 to the bottom of the vehicle 11.

Figure 3:
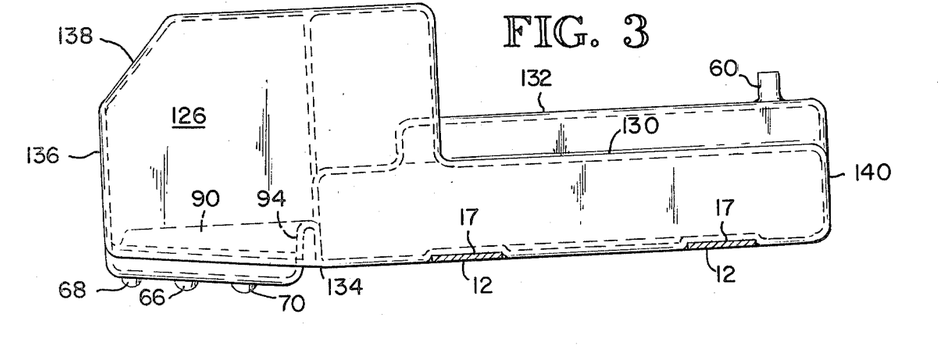
FIG. 3 is an elevational view of the left side of FIG. 1.

Slight recesses 17 (FIGS. 3, 10) are provided in the bottom of the tank 10 to receive the straps 12, 18 in order to assure the straps are properly located. The recesses are preferably coextensive with the straps 12, 18. However, the recesses could be eliminated for the straps 18 and extend inwardly from the edges of the tank 10 only a few inches for the straps 12. The straps 12, 18 can be formed from any suitable material, such as stainless steel, ordinary steel, or even some form of plastic webbing or banding.

Referring again to FIG. 1, it is seen that the front portion of the auxiliary tank includes a recess 34 in which is mounted a fuel gauge sending unit, generally designated at 36. The sending unit 36 is mounted to the auxiliary tank 10 in any convenient way and comprises a float 38 on the end of a float arm 40, an electrical sensor 42, an electrical connector 43 and electrical signaling wires 44. The sending unit 36 is of conventional construction and operates in the conventional manner, namely that the float 38 moves the float arm 40 depending on the depth of the fuel in the auxiliary tank. The electrical sensor 42 detects the relative position of the float arm 40 and generates an output signal which is transmitted to the car's fuel gauge (not illustrated) via the electrical signaling wires 44 to indicate the amount of fuel in the tank. The sending unit 36, per se, comprises no part of the present invention and any conventional sending unit could be utilized. Since, in its normal installation, the top of the front of the auxiliary tank 10 is adjacent the bottom of the car, the recess 34 spaces the sending unit 36 downwardly enough so that the connector 43 for the electrical signalling wires 44 are below the bottom of the car.

Figure 6:
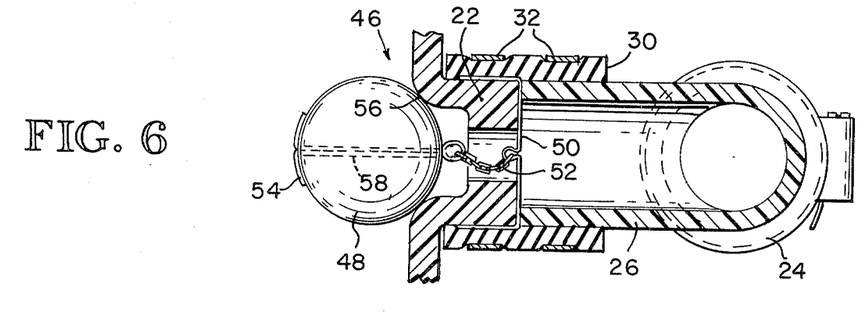
FIG. 6 is a cross sectional view of the fuel filler inlet of the auxiliary fuel tank of the present invention taken along line 6—6 of FIG. 1.

As seen in FIGS. 1 and 6, the auxiliary tank 10 is preferably filled through a fuel filler inlet 22 which is spliced into the car's normal fuel filler pipe 24 with a plastic tee 26 after the pipe 24 has been severed and a short piece removed. The stem of the tee 26 is secured to the tank's fuel filler inlet 22 by means of a short sleeve of rubber hose 30 which is secured to the inlet 22 and tee 26 with a pair of hose clamps 32. The cross of the tee 26 is secured to the ends of the filler pipe 24 with hose clamps 28.

Although in view of the disclosures herein, other means of providing for the rapid filling of the auxiliary fuel tank 10 will occur to those skilled in the art, the construction set forth is preferred since it provides for the rapid filling of the auxiliary tank in a particularly convenient manner. In addition, by locating the fuel filler inlet 22 adjacent the top of the forward part of the auxiliary tank 10, no separate vent is needed for the front portion of the auxiliary tank 10, since that portion of the tank will vent through the fuel filler pipe 24.

In order to provide venting of the rear portions of the auxiliary tank 10, a vent outlet 60 is provided which has secured thereto a vent tube 62 by means of clamp 64. The vent 60 and vent tube 62 permit air to escape from the tank as it is being filled and also permits air to enter the tank as the tank is being emptied. The vent tube 62 is preferably interconnected with the car's fuel tank evaporative loss control system in order to minimize air pollution.

Turning again to FIG. 6, it is seen that the fuel filler inlet 22 of the auxiliary tank 10 incorporates a check valve, generally designated at 46. The check valve 46 comprises a valve seat 56, and a check ball 48 connected to the inlet 22 by a cotter pin 50, a short length of chain 52 and a second cotter pin 54. The valve seat 56 is automatically formed during the rotational molding of the auxiliary tank 10. The check ball 48, which may be of any fuel resistant, generally neutral buoyancy substance such as nylon, includes a diametrical bore 58.

In order to assemble the check valve 46, the ends of the chain 52 are secured to the eyes of the cotter pins 50, 54. Then the cotter pin 54 is inserted into the bore 58 in the check ball 48 and its ends spread against the outer surface of the check ball 48 in the conventional manner. Then the check ball 48, with its associated cotter pin 54, chain 52, and cotter pin 50, are inserted into the auxiliary fuel tank 10 through the opening in which the fuel gauge sending unit 36 will be subsequently mounted, and the tank is tilted until the check ball 48 is adjacent the valve seat 56. At that time the cotter pin 50 is withdrawn from the inlet 22 and its ends bent over the outer surface of the inlet 22 where they are then secured by the hose 30 and hose clamp 32 which interconnect the fuel filler tee 26 and the fuel inlet 22.

Figure 7:
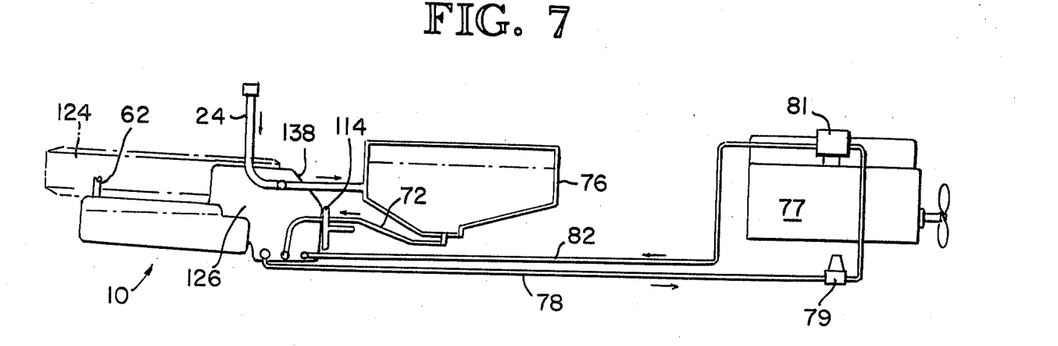
FIG. 7 is a schematic representation showing the auxiliary fuel system installed in a car.
Figure 10:
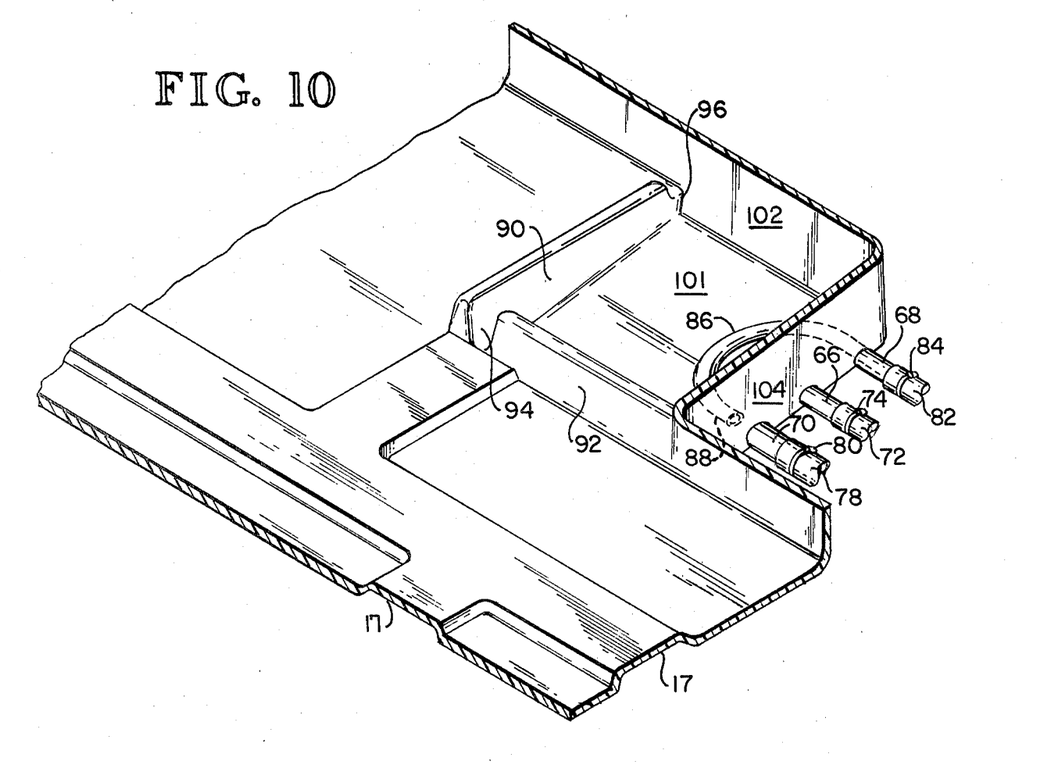
FIG. 10 is a perspective view of the sump portion of the auxiliary fuel tank, including its associated fuel connections, with the top of the tank broken away for clarity.

Referring again to the figures, and in particular FIGS. 7 and 10, it is seen that the auxiliary tank 10 is provided with a fuel transfer inlet 66, a fuel return inlet 68, and a fuel delivery outlet 70. In making connections to the auxiliary tank's inlet 66 and the outlet 70, it is preferred that first the car's installed fuel delivery line from its main tank 76 to its engine be severed near the main tank 76. Then, one end of a fuel delivery line 78 is connected to the auxiliary tank's fuel delivery outlet 70 with a hose clamp 80, and its other end is connected, as by a hose clamp, to the severed end of the portion of car's installed fuel delivery line which goes to the engine 77. Thus, after these connections are made, fuel will be delivered to the engine 77 from only the auxiliary tank, via the fuel delivery line 78 and the portion of the car's installed fuel delivery line which goes to the engine.

Next, one end of a fuel transfer line 72 is connected to the auxiliary tank's fuel transfer inlet 66 with hose clamp 74, while its other end is connected, as by a hose clamp, to the stub portion of the car's severed installed fuel delivery line which extends from the car's main tank 76 so fuel is transferred from the main tank to the auxiliary tank 10 by gravity or siphon feed.

Accordingly, it will be appreciated that after the foregoing connections are made, fuel is no longer fed directly from the main tank to the engine. Instead, fuel in the main tank is transferred to the auxiliary tank 10 via the fuel transfer line 72, and is then delivered from the auxiliary tank to the engine via the fuel delivery line 78 and the car's installed fuel delivery line.

Such an arrangement is preferred where, as seen in FIG. 7, the lowest point in the installed auxiliary fuel tank is lower than the main tank and/or the car's installed fuel delivery line, since it assures that the main tank 76 will always be emptied through the fuel transfer line 72, and that the auxiliary tank will be emptied to the maximum extent possible.

Alternatively, if the lowest point in the installed auxiliary fuel tank 10 is higher than the main tank and/or the installed fuel delivery line, then it is preferred that the fuel transfer inlet 66 and line 72 not be used, and that the fuel delivery line 78 be spliced, as with a tee fitting, directly into the car's installed fuel delivery line, so both the auxiliary tank 10 and the main tank 71 feed directly into the car's installed fuel delivery line, thereby eliminating the need for the fuel transfer line 72.

Thus, in all cars, whether diesel or non-diesel, it is preferred that the fuel delivery line 78 is always used, while the fuel transfer line 72 can be eliminated in the circumstances mentioned above. However, it should be noted that in at least some diesel and gasoline cars, such as the Volkswagen diesel Rabbit, the fuel pump 79 is designed to deliver more fuel to the fuel injectors 81 than they can accept, typically at a rate of 200–400 gallons per hour for some diesel cars and 400–600 gallons per hour for some gasoline cars. In such cars, the excess fuel is returned to the car's main tank 76 via the car's installed fuel return line.

In the situation described earlier, where the bottom of the installed auxiliary fuel tank 10 is higher than the bottom of the main tank and/or the car's installed fuel delivery line, where the fuel transfer inlet 66 and line 72 are not used, and where the fuel delivery line 78 is spliced into the car's installed fuel delivery line, then the car's installed fuel return line can be left connected to the car's main tank.

However, in the case previously described where the bottom of the installed auxiliary tank is lower than the bottom of the main tank and/or the car's installed fuel delivery line, where the fuel transfer line 72 is used, and where fuel is transferred from the car's main tank to the auxiliary tank before delivery to the engine via the delivery line 78, then a different approach is preferred. In this case the car's installed fuel return line is first severed adjacent the main tank and then the stub on the main tank is plugged in any convenient manner. Next, one end of a fuel return hose 82 is connected to the portion of the fuel return line coming from the car's engine, as by hose clamp, and its other end is connected to the fuel return inlet 68 of the auxiliary tank by a hose clamp 84. As a result, of course, the fuel returned from the car's engine is returned to the auxiliary tank instead of to the main tank.

The reason for returning fuel to the auxiliary tank instead of to the main tank is best understood when it is recalled that in the case now under consideration fuel in the main tank goes to the auxiliary tank 10 via the fuel transfer line 72, and then to the engine from the auxiliary tank 10 via the fuel delivery line 78; and that fuel is returned from the car's engine at the rate of 200-600 gallons per hour. So, assuming now that the main tank is empty and that the fuel level in the auxiliary tank is low, if the returning fuel were returned to the main tank, the fuel pump might transfer fuel from the auxiliary tank to the main tank faster than the fuel could be returned to the auxiliary tank via the fuel transfer line. Thus, unless the returning fuel was delivered directly to the auxiliary tank 10, the car might "run out" of fuel, since the fuel might accumulate in the main tank, rather than in the auxiliary tank where it was needed for delivery to the engine.

Turning now to other matters, it will be seen from the figures that the auxiliary tank 10 has a generally flat bottom to maximize its capacity while minimizing its thickness so as not to unduly reduce the car's ground clearance. However, when its fuel level is low a flat bottomed auxiliary tank has difficulty in retaining sufficient fuel adjacent its fuel delivery outlet 70. This problem is compounded when the car accelerates, decelerates, or turns corners since these actions are likely to cause the fuel to leave the vicinity of the outlet 70. In addition, in diesel cars, fuel returning under pressure to the auxiliary tank's fuel return inlet 68 tends to spray away from the fuel delivery outlet 70.

Referring now to FIG. 10, means are illustrated for helping to insure that sufficient fuel is maintained in the vicinity of the fuel delivery outlet 70 even when the fuel level in the auxiliary tank is quite low, and despite the car's acceleration, deceleration or cornering. This means comprises a short longitudinal wall 90 and a short transverse wall 92. It should be noted that there is a narrow slot 94 located between the ends of the walls 90, 92, and a narrow slot 96 between the other end of the wall 90 and the side of the tank 102.

It will be appreciated that together, the side walls 102, 104 of the tank and walls 90, 92, form a sump 101 for the auxiliary tank, despite the tank's having a substantially flat bottom. As seen in the figures the bottom of the sump can be slightly lower than the rest of the bottom of the auxiliary tank 10. Preferably, the walls 90, 92 are high enough, say about ¾ of an inch above the bottom of the tank, the bottom of the sump 101 is low enough, say about ⅜ of an inch below the bottom of the rest of the land, and slots 94, 96 are sized small enough, say about ⅛ of an inch wide, so that when the car is accelerating, decelerating, or turning, it will take about 10–15 seconds for the sump 101 to empty through the slots. Of course, at other times the slots 94, 96 permit fuel to enter the sump 101 at a rate faster than it is being drawn out and consumed by the car's engine.

Alternatively, the bottom of the sump 101 could be at about the same level with the rest of the bottom of the tank 10, and the walls 90, 92 could be made higher, say about 1½ inches to at least partially achieve the same ends.

As has been mentioned, when a generally flat bottomed auxiliary tank 10 is utilized on a diesel car having a fuel return line, the fuel returning under pressure to the tank's fuel return inlet 68 will tend to spray away from the fuel delivery outlet 70. This will, of course, increase the possibility of there not being sufficient fuel delivered to the outlet 70, especially when there is a low fuel level in the tank 10 and when the car accelerates, decelerates, or turns corners. The sump 101 does help to solve this problem since if the transverse wall 92 is sized properly, the fuel returning from the fuel return inlet 68 would strike it and tend to remain within the sump 101. Alternatively, a splash wall, not illustrated, could be positioned within the sump 101 opposite the fuel return inlet 68 so the fuel returning from the fuel return inlet 68 will strike it and tend to remain within the sump 101.

However, it is preferred that a jet line 86, extend between the fuel return inlet 68 and the fuel delivery outlet 70, as best seen in FIG. 10. The free end 88 of the jet line 86 is spaced about one-half of an inch from the fuel delivery outlet 70 and is aimed so that the fuel returning under pressure from the engine will be squirted directly into the fuel delivery outlet 70. This impinging of the returning fuel on the fuel delivery outlet 70 also has the beneficial effect of creating a suction which will aspirate any fuel in the vicinity of the fuel delivery outlet 70 into the fuel delivery outlet. As best seen in FIG. 10, the opening of the outlet 70 is flush with the bottom of the sump 101, is enlarged, and smoothly and gradually tapers into the final interior diameter of the outlet 70.

The jet line 86 can be formed from any suitable material, such as aluminum or copper tubing, and is installed in the auxiliary tank before the fuel return hose 82 is connected to the fuel return inlet 68. The jet line 86 is installed by bending it to the desired shape and then mounting it in the auxiliary tank by feeding its free end 88 through the fuel return inlet 68 until the free end 88 is properly located opposing the fuel delivery outlet 70. The length of the jet line 86 is such that when the free end 88 is properly located, a portion of the jet line still remains within the fuel return inlet 68. After the jet line 86 is in place, the fuel return hose 82 is connected to the fuel return inlet 68 and secured with hose clamp 84. It has been discovered that no additional means are necessary to secure the jet line 86 in place, since the hose clamp 84, if tightened sufficiently, will plastically deform the fuel return inlet 68 an amount sufficient to firmly engage and hold the jet line 86 in place.

The jet line 86 is so effective because nearly all, if not all of the fuel being returned to the auxiliary tank via the fuel return line 82 is delivered directly to the fuel delivery outlet 70. This is especially important when it is recalled that fuel is being returned to the auxiliary tank at a rate of 200-600 gallons per hour, and if the returning fuel were simply squirted into the auxiliary tank 10, the fuel pump might not be able to suck sufficient fuel out of the auxiliary tank when the fuel level in the auxiliary tank was low. In addition, as has been mentioned, the suction caused by the fuel impinging on the outlet 70, helps to draw additional fuel into the outlet 70.

Figure 11:
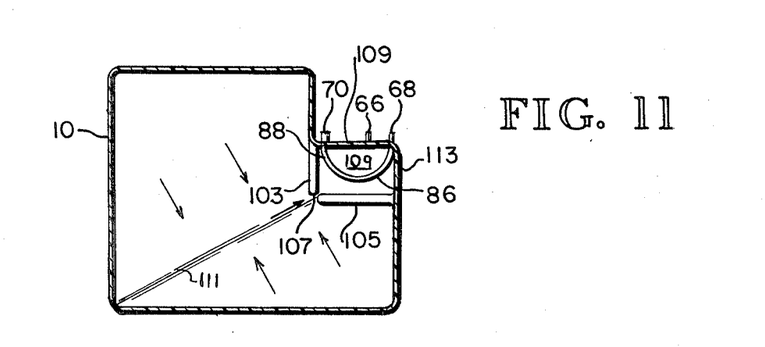
FIG. 11 is a schematic representation of an alternative embodiment of the bottom of the auxiliary fuel tank, with the top of the tank broken away for clarity.
Figure 12:
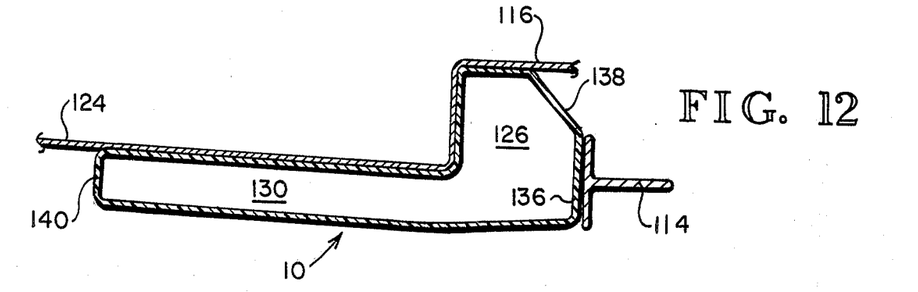
FIGS. 12-15 are schematic representations of the behavior of the auxiliary fuel tank of the present invention during a collision.

Referring now to FIG. 11, an alternative construction of the bottom and interior of the auxiliary tank 10 is shown. In FIG. 12, it is noted that a sump 109 is formed in the area of the fuel inlets 66, 68 and outlet 70 by the tank's sidewalls 109, 113, and by upstanding sump walls 103, 105, between which is located a slot 107. The sump 109 is just slightly lower, say one-half of an inch, than the highest parts of the bottom of the tank. The bottom of the tank is shaped so that the fuel will be directed to a crease 111 which in turn directs the fuel into the slot 107, and thus into the sump 109 despite the generally flat bottom of the tank 10. The crease serves the additional function of serving to strengthen the bottom of the auxiliary tank to prevent any inward bowing of the tank which might otherwise interfere with fuel flow into the sump 109.

As before, the area within the sump 109 adjacent the outlet 70 can be slightly lower than the rest of the sump, and a jet line 86 could be installed between the fuel return inlet 68 and the outlet 70. It will be appreciated that the construction shown in FIG. 12 will serve to keep the maximum amount of fuel adjacent the outlet 70 despite the tank's almost flat bottom; despite there being a low level of fuel in the auxiliary tank, and despite the car accelerating, decelerating or cornering.

As has been mentioned, the auxiliary tank 10 of the present invention is intended to be secured to the bottom of the rear portion of the model of car with which it is adapted to be used. By way of non-limiting example, the tank 10 shown in the figures is especially adapted to be used with a Volkswagen Rabbit model car. As best seen in FIGS. 7 and 8, a Rabbit has an installed fuel tank 76, a transversely extending T-shaped rear frame member 114, and a spare tire wheel well 124 which depends from the trunk of the car. The car's spare tire, of course, is carried within the well 124.

Figure 2:
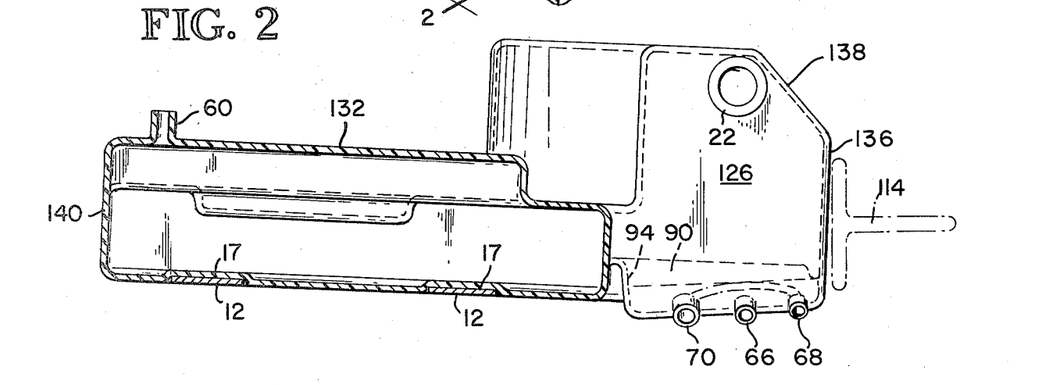
FIG. 2 is a cross sectional view of the auxiliary fuel tank in said system taken along line 2—2 of FIG. 1.

Referring particularly to FIG. 7, and comparing it with FIG. 1, it will be seen how the enlarged front portion 126 of the tank 10 fits the space between the car's rear frame member 114 and its wheel well 124, with the top of the tank's front portion 126 being adjacent the bottom of the car, and the curve 128 of the front portion nesting against the wheel well 124. The large flat portion 130 of the tank 10 fits beneath the bottom of the wheel well. The elevated rectangular portion 132 rests adjacent the side of the wheel well, although this is not illustrated in FIG. 7 for purposes of clarity. The generally flat bottom of the tank is preferably at about the same level as the bottom of the frame member 114, so the car's ground clearance is not significantly reduced. As seen in FIG. 2, there is a break 134 in the slope of the bottom of the tank so that the bottom of the front portion of the tank 10 is about level, while the bottom of the rear portion of the tank 10 rises slightly to give the car additional ground clearance in this area. This may be important, since when the car enters or leaves a driveway having a steep lip, for example, one needs the additional clearance to help to prevent the rear of the bottom of the tank from hitting the lip.

Again, by way of non-limiting example, the tank 10 illustrated is adapted to fit around a wheel well about twenty-six inches in diameter. The front portion 126 of the tank has a maximum height of seven inches, a width of 18½ inches, a vertical front wall 136 which is 4 inches high and an inclined front wall 138 which is 3¼ inches wide. The large flat portion 130 of the tank is 2½ inches thick, has a maximum width of 26¼ inches, a maximum length from wall 140 to wall 128 of 18½ inches and a length between walls 140 and 104 of 15½ inches. The tank 10 has a fuel capacity of 8.5 gallons.

Naturally it is understood that the particular shape of the tank 10, will vary in order to make it conform to the bottom of the particular model of car on which it is installed.

The tank 10 is preferably molded in one piece, for reasons of strength and economy, from any suitable plastic, although it could be made from other strong, durable, impact resistant materials such as sheet steel. A particularly suitable plastic is a high density, cross linkable polyethylene resin such as Marlex CL-100 produced by the Phillips Petroleum Company of Bartlesville, Oklahoma. The tank 10, including the fuel filler inlet 22, fuel inlets 66, 68, fuel outlet 70, vent outlet 60, and sump walls 90, 94, 96, 103 and 105, are preferably molded in one piece. Conventional rotational molding techniques can be used to produce the tank and for the particular tank described, includes the steps of introducing ten pounds of Marlex powder into the mold, heating and spinning the mold until the polyethylene has cross linked, and then removing the finished tank from the mold. It is preferred that the tank 10 be at least one-eighth of an inch in thickness for strength and impact resistance.

After the tank has been molded, the mounting hole for the fuel gauge is cut out, and, if necessary, the vent 60, inlets 22, 66, 68, and outlet 70 may be drilled out. As has been mentioned, the valve seat 56 in the inlet 22 and the smoothly tapering opening in the outlet 70 are automatically formed during the rotational molding process.

Now that a detailed description has been given of the auxiliary fuel system of the present invention, including the auxiliary tank 10 and its associated supports and connections, a description of the auxiliary fuel system's behavior during a rear end collision involving the car in which it is installed will now be given. Reference is had to FIGS. 12-15 which are in schematic form and are only intended to be illustrative of the principles of operation of the auxiliary fuel system of the present invention during a collision.

FIGS. 12-15 show the tank 10 installed in a Volkswagen Rabbit wherein are seen the car's T-shaped rear main transverse structural frame member 114 and wheel well 124. For purposes of clarity, the tank's mounting straps 12 and its fuel connections are not illustrated.

As will be appreciated, during a rear end collision of the car in which the auxiliary fuel tank 10 is installed, the rear end of the car will be crushed in an amount which will be greater or lesser depending on the severity of the collision. Referring to FIG. 8, it is seen that since the rear of the auxiliary tank 10 is spaced a substantial distance from the rear of the car, when the car is involved in a rear end collision involving only a small amount of relative motion between the two cars, the auxiliary fuel tank will remain in place.

However, as the severity of the rear end collision increases, the unique action of the auxiliary fuel system of the present invention comes into play. By way of example, let us assume that the car in which the auxiliary tank 10 is installed is involved in a rear end collision where there is a relative speed difference between the two cars of 30 miles an hour at the time of the collision. Such a situation could arise, for example, if the car is stopped at a red light in a 30 mile an hour zone, and someone who has failed to see the stop light slams into the rear end of the car at a speed of 30 miles an hour.

Figure 13:
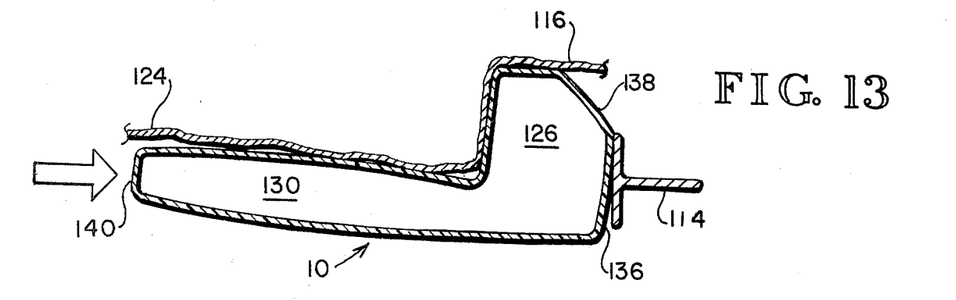
Figure 14:
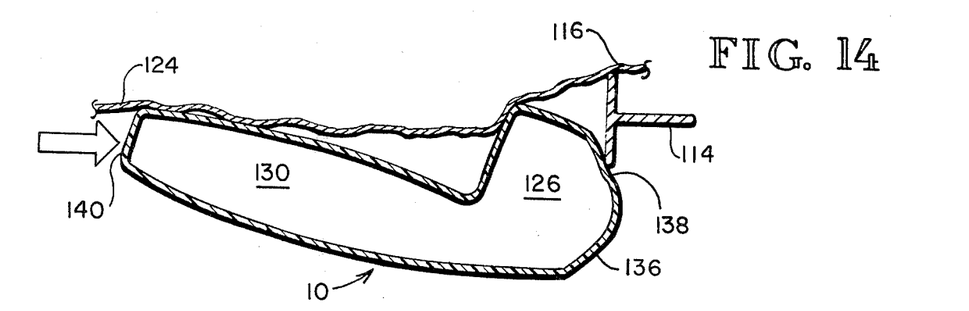
Figure 15:
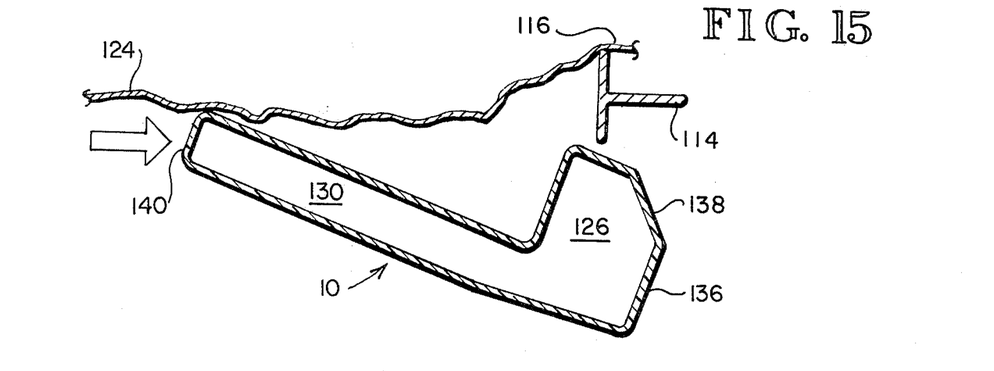

Referring now to FIGS. 13-15, it will be appreciated that in a relatively severe rear end collision, such as the one under consideration, the rear end of the car in which the auxiliary tank 10 is installed will be crushed in, forcing the auxiliary tank 10 strongly against the transverse member 114. In addition, during the collision a large fluid shock, which forces the tank 10 forwardly, is imparted to the tank 10 as the fuel within the tank tends to surge forward as the result of the collision. The combination of these forces results in the auxiliary tank 10 being driven forcefully against the transverse member 114 as the collision proceeds.

As best illustrated in FIGS. 13 and 14, as the front of the tank is forced harder and harder against the transverse member 114, the inclined front wall 138 makes contact with the transverse member 114 and deflects the front portion 126 of the auxiliary tank downwardly as it moves forwardly, as best seen in FIG. 14. This process is assisted by the fact that in severe collisions, the fluid shock causes the front portion 136 of the tank 10 to plastically deform and bulge. If desired, the inclined wall 138 could be covered with a metal plate to increase its impact resistance.

As also best seen in FIGS. 13 and 14, as the rear end of the vehicle is being crushed and as the fluid shock is affecting the tank 10, the large shallow area 130 bulges outwardly, and in particular upwardly against the bottom of the wheel well 124. This bulging of the large shallow area 130 helps to assist the downward movement of the front portion 126 of the tank 10 as it moves forwardly.

Referring again to FIGS. 1, 4 and 8, as has been mentioned, the transverse mounting straps 12 and their longitudinal reinforcing straps 18 form a basket like arrangement for holding the tank 10. It is to be particularly noted that the mounting straps 12 are located away from the front portion of the tank, and are secured adjacent the sides of the tank 10 and not at the front of the tank 10. As a result of this unique arrangement and location of mounting straps 12, 18, it will be appreciated that the mounting straps 12, 18 securely hold the tank 10 to the vehicle prior to a collision but will not significantly impede the above described forward and downward motion of the tank during a severe rear end collision.

After the 30 mph collision is over, as seen in FIG. 15 the tank 10 will come to rest beneath the transverse member 114 with the rear portion of the tank 10 still hanging from its support straps 16, 18.

Enough slack is allowed in the tank's associated fuel lines 72, 78 and 82 to accommodate the amount of forward and downward motion of the tank during the collision shown in FIGS. 13-15. In addition, the check ball 48 in the check valve 46 will be forced tightly against the valve seat 56 as the tank is subjected to fluid shock during the collision, thereby preventing fuel from spurting from the tank's fuel filler inlet 22 during the collision, even should the inlet tee fitting 26 or the car's fuel filler pipe 24 become unattached from the fuel filler inlet 22 during the collision.

From the foregoing, it is seen that the auxiliary fuel tank 10 of the present invention is able to survive a rear end collision of the car in which it is installed by its unique diving action which keeps the auxiliary tank from being crushed against the transverse member 114 during the collision. Of course, no auxiliary tank will withstand a rear end collision if it is severe enough, but the basic auxiliary fuel system disclosed herein has successfully passed the United States Federal Motor Vehicle Safety Administration's federal standard 301-75 which deals with fuel system integrity after a 30-55 mph rear end collision and 360 degree rollover.

Although the exact shape of the tank 10 will vary depending on the particular model car on which it is installed, its unique diving action can be assisted by equipping the tank 10 with an inclined front wall 138 and/or a large shallow portion 130 regardless of otherwise conforming the tank 10 to fit the space available beneath the particular model car with which it is adapted to be used.

Figure 9:
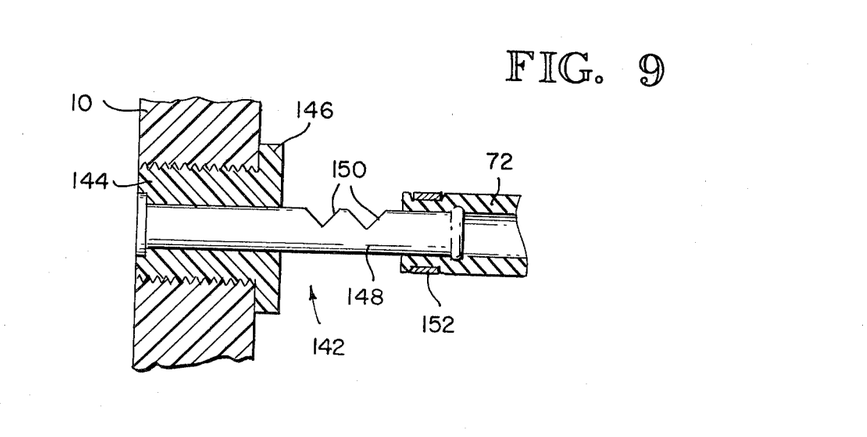
FIG. 9 is a view, partly in cross section, showing a pre-crimped break and seal fitting which may be used in the present invention to connect the fuel lines to the auxiliary tank.

Referring now to FIG. 9, it is also within the scope of the present invention that instead of using the molded-in-place fuel transfer inlet 66, fuel return inlet 68 and fuel delivery outlet 70, each of the same could be replaced by a conventional precrimped break and seal fitting 142 as shown in FIG. 9. The fitting 142 includes a threaded portion 144 which may be screwed with its nut 146 directly into a hole drilled in the auxiliary tank 10. The neck 148 of the fitting 142 is made from thin walled tubing and is provided with a pair of crimps 150 as illustrated. Any particular fuel line, as for example the fuel transfer line 72, is connected to its respective fitting 142 by a hose clamp 152.

During a rear end collision severe enough to cause the auxiliary tank to move forwardly and downwardly a substantial distance, the relative motion between the auxiliary tank 10 and its associated fuel lines 72, 78, 82 will bend, and possibly break, the thin walled neck 148 of the break and seal fitting 142 at the crimps 150 to seal both the tank 10 and its associated fuel lines.

From the foregoing description of the preferred embodiments of the auxiliary fuel system of the present invention, various further applications, modifications and adaptations of the system will be apparent to those skilled in the art to which the invention is addressed, within the scope of the following claims.

We claim:

1. A collision resistant fuel system for a motor vehicle, wherein the fuel system has an enhanced ability to survive a rear end collision of the vehicle on which it is mounted, the fuel system comprising:
   a fuel tank; and
   mounting means for releasably securing the fuel tank to the exterior of the bottom of the rear portion of the vehicle;
   wherein the mounting means are for securely holding the fuel tank in place during normal operation of the vehicle; and
   wherein the mounting means are for at least partially releasing the fuel tank to permit forward movement of the fuel tank beneath the vehicle relative to the vehicle during said rear end collision of the vehicle to help avoid the crushing and rupturing of the fuel tank which might otherwise occur; wherein said fuel tank is adapted to be pushed forwardly by the rear end of said vehicle when said rear end is being crushed in during said collision; and wherein at the end of at least up to a 30 mph relative speed rear end collision, said mounting means are adapted to still at least partially hold said tank.

2. The collision resistant fuel system according to claim 1, wherein the mounting means are for at least partially releasing the fuel tank to permit both forward and downward movement of the fuel tank relative to the vehicle during said rear end collision of the vehicle to help avoid the crushing and rupturing of the fuel tank which might otherwise occur.

3. A collision resistant fuel system for a motor vehicle, wherein the fuel system has an enhanced ability to survive a rear end collision of the vehicle on which it is mounted, the fuel system comprising:
a fuel tank; and
mounting means for releasably securing the fuel tank to the exterior of the bottom of the rear portion of the vehicle;
wherein the mounting means are for securely holding the fuel tank in place during normal operation of the vehicle;
wherein the mounting means are for at least partially releasing the fuel tank to permit forward movement of the fuel tank relative to the vehicle during said rear end collision of the vehicle to help avoid the crushing and rupturing of the fuel tank which might otherwise occur; and
wherein the mounting means comprise at least one transverse support strap extending transversely with respect to the longitudinal axis of the vehicle, wherein the ends of said transverse support strap are secured to said vehicle near the sides of the fuel tank and the central portion of said support strap passes over said fuel tank, and wherein said at least one strap is sized and located to be adapted to help permit said movement of the fuel tank during said collision.

4. The collision resistant fuel system according to claim 3, wherein the mounting means are located away from the front of the fuel tank to enhance the fuel tank's freedom to make said movement relative to the vehicle during said collision.

5. A collision resistant fuel system for a motor vehicle, wherein the fuel system has an enhanced ability to survive a rear end collision of the vehicle on which it is mounted, the fuel system comprising:
a fuel tank; and
mounting means for releasably securing the fuel tank to the exterior of the bottom of the rear portion of the vehicle;
wherein the mounting means are for securely holding the fuel tank in place during normal operation of the vehicle;
wherein the mounting means are for at least partially releasing the fuel tank to permit forward movement of the fuel tank relative to the vehicle during said rear end collision of the vehicle to help avoid the crushing and rupturing of the fuel tank which might otherwise occur; and
wherein the fuel tank is located rearwardly of a transverse member of the vehicle, and the fuel tank includes an inclined wall on its forward portion which, during said movement of the fuel tank during said collision, is adapted to strike said transverse member, forcing the fuel tank to move downwardly as it moves forwardly, to help prevent the fuel tank from being crushed against the transverse member during said collision.

6. The collision resistant fuel system according to claim 5, wherein the fuel tank includes a vertically enlarged forward portion which defines said inclined wall, the vertically enlarged forward portion and the rear portion of the fuel tank tending to enable the fuel tank to form a bridge between said transverse member and the bottom of the vehicle during said collision to help keep as much of the fuel tank as possible away from the collapsing rear end of the vehicle in order to prevent damage to the fuel tank during said collision.

7. The collision resistant fuel system according to claim 5, wherein the fuel tank includes a large portion which is relatively shallow as compared to its area to enhance the ability of the middle of said large portion to bulge outwardly against the bottom of the vehicle during said collision to assist the downward movement of the forward portion of the fuel tank during said collision.

8. The collision resistant fuel system according to claim 7, wherein the fuel tank is made of plastic to enable it to bulge during said collision to help the fuel tank to move downwardly as it moves forwardly; so it can deform without rupturing as it contacts the vehicle during said collision; and so it can deform during said collision to help it shrug off said support means as it moves forwardly and downwardly during said collision.

9. A collision resistant fuel system for a motor vehicle, wherein the fuel system has an enhanced ability to survive a rear end collision of the vehicle on which it is mounted, the fuel system comprising:
a fuel tank; and
mounting means for releasably securing the fuel tank to the exterior of the bottom of the rear portion of the vehicle;
wherein the mounting means are for securely holding the fuel tank in place during normal operation of the vehicle;
wherein the mounting means are for at least partially releasing the fuel tank to permit forward movement of the fuel tank relative to the vehicle during said rear end collision of the vehicle to help avoid the crushing and rupturing of the fuel tank which might otherwise occur;
wherein the fuel tank includes:
a fuel delivery outlet;
a substantially flat bottom; and
a sump within the fuel tank which is formed by an upstanding wall defining an aperture;
wherein said fuel delivery outlet is within said sump; wherein said sump is at least slightly lower than the rest of the bottom of the fuel tank; and wherein said bottom includes a crease which not only directs fuel to flow towards said aperture in said upstanding wall forming said sump, but also serves to strengthen the bottom of said fuel tank.

10. A collision resistant fuel system for a motor vehicle, wherein the fuel system has an enhanced ability to survive a rear end collision of the vehicle on which it is mounted, the fuel system comprising:
a fuel tank; and mounting means for releasably securing the fuel tank to the exterior of the bottom of the rear portion of the vehicle;

wherein the mounting means are for securely holding the fuel tank in place during normal operation of the vehicle;

wherein the mounting means are for at least partially releasing the fuel tank to permit forward movement of the fuel tank relative to the vehicle during said rear end collision of the vehicle to help avoid the crushing and rupturing of the fuel tank which might otherwise occur; and wherein fuel tank includes a fuel fill inlet and a check valve, wherein the check valve comprises:

a check ball, located inside the fuel tank;

a valve seat for the check ball, wherein the valve seat is located on the inner surface of the fuel tank at said fuel fill inlet; and a tether for loosely holding the check ball in the immediate vicinity of the valve seat;

wherein when fuel is added to the tank, it easily pushes past the loosely tethered check ball so it may enter the tank; and wherein during said rear end collision any fuel which tries to exit from the fuel tank through the fuel fill inlet carries the check ball with it and forces the check ball against the valve seat to help prevent fuel from exiting from the fuel tank through the fuel fill inlet.

11. The collision resistant fuel system according to claim 10, wherein the fuel tank and its fuel fill inlet are formed from plastic by a rotational molding process; and wherein said valve seat comprises the smoothly rounded shoulder automatically formed on the inner surface of the fuel tank around the fuel fill inlet during the rotational molding process.

12. The collision resistant fuel system according to claims 3, 4, 5, 6, 7, 8, 9, 10, or 11, wherein the mounting means are for at least partially releasing the fuel tank to permit both forward and downward movement of the fuel tank relative to the vehicle during said rear end collision of the vehicle to help avoid the crushing and rupturing of the fuel tank which might otherwise occur.

* * * * *